United States Patent
Wilson et al.

(10) Patent No.: US 12,509,220 B2
(45) Date of Patent: Dec. 30, 2025

(54) AIRCRAFT WING WITH A MOVEABLE WING TIP

(71) Applicants: AIRBUS OPERATIONS LIMITED, Bristol (GB); AIRBUS OPERATIONS GmbH, Hamburg (DE)

(72) Inventors: Thomas Wilson, Bristol (GB); Theo Meyer, Hamburg (DE); Michael Wrightson, Hamburg (DE)

(73) Assignees: AIRBUS OPERATIONS LIMITED, Bristol (GB); AIRBUS OPERATIONS GmbH, Hamburg (DE)

( * ) Notice: Subject to any disclaimer, the term of this patent is extended or adjusted under 35 U.S.C. 154(b) by 0 days.

(21) Appl. No.: 18/741,538

(22) Filed: Jun. 12, 2024

(65) Prior Publication Data

US 2024/0417059 A1 Dec. 19, 2024

(30) Foreign Application Priority Data

Jun. 16, 2023 (GB) ..................................... 2309092

(51) Int. Cl.
*B64C 23/06* (2006.01)
*B64C 3/38* (2006.01)
*B64C 3/54* (2006.01)
*B64C 3/56* (2006.01)

(52) U.S. Cl.
CPC ............ *B64C 23/072* (2017.05); *B64C 3/385* (2013.01); *B64C 3/546* (2013.01); *B64C 3/56* (2013.01)

(58) Field of Classification Search
CPC .. B64C 3/56; B64C 3/385; B64C 3/42; B64C 13/50; B64C 23/00; B64C 23/072; B64C 3/38; B64C 3/546; B64C 13/16; B64C 23/065; Y02T 50/10
See application file for complete search history.

(56) References Cited

U.S. PATENT DOCUMENTS

| | | | |
|---|---|---|---|
| 9,637,225 B1 * | 5/2017 | Zickuhr | B64C 23/069 |
| 11,427,307 B2 * | 8/2022 | Petscher | B64C 23/069 |
| 11,780,555 B1 * | 10/2023 | Karem | B60V 3/08 244/130 |

(Continued)

FOREIGN PATENT DOCUMENTS

| | | |
|---|---|---|
| GB | 2546246 A | 7/2017 |
| GB | 2565082 A | 2/2019 |

(Continued)

OTHER PUBLICATIONS

Combined Search and Examination Report for GB2309092.1, dated Mar. 25, 2024, 7 pages.

(Continued)

*Primary Examiner* — Assres H Woldemaryam
(74) *Attorney, Agent, or Firm* — Nixon & Vanderhye P.C.

(57) ABSTRACT

An aircraft wing is provided having a fixed wing with a gulled wing tip rotatably mounted at the tip thereof, the gulled wing tip extending below a wing plane defined by the end of the fixed wing such that the centre of gravity of the gulled wing tip is located below the wing plane. Lowering the centre of gravity of the gulled wing tip has been found to reduce the onset of flutter. The gulled wing tip may be gulled about a hinge axis where it meets the fixed wing, or may be otherwise folded or curved to lower the centre of gravity of the gulled wing tip.

14 Claims, 8 Drawing Sheets

(56) References Cited

U.S. PATENT DOCUMENTS

| | | | |
|---|---|---|---|
| 2004/0000619 A1 | 1/2004 | Barriety | |
| 2005/0133672 A1* | 6/2005 | Irving | B64C 23/072 |
| | | | 244/201 |
| 2008/0223991 A1* | 9/2008 | Mann | B64C 23/069 |
| | | | 244/199.4 |
| 2015/0360765 A1* | 12/2015 | Bradshaw | B64C 23/076 |
| | | | 244/45 R |
| 2016/0368594 A1* | 12/2016 | Cazals | B64C 3/38 |
| 2017/0021911 A1* | 1/2017 | Wildschek | B64C 3/42 |
| 2017/0029089 A1* | 2/2017 | Alexander | B64F 5/10 |
| 2017/0247105 A1* | 8/2017 | Heller | B64C 23/069 |
| 2019/0002083 A1* | 1/2019 | Wilson | B64C 23/072 |
| 2019/0185137 A1* | 6/2019 | Orchard | B64C 3/56 |
| 2019/0322355 A1* | 10/2019 | Wilson | B64C 9/146 |
| 2020/0039630 A1* | 2/2020 | Kamila | B64C 23/065 |
| 2020/0172227 A1* | 6/2020 | Way | B64C 3/48 |
| 2020/0207461 A1* | 7/2020 | Dussart | B64C 3/546 |
| 2020/0208687 A1* | 7/2020 | Dussart | B64C 3/56 |
| 2022/0177112 A1* | 6/2022 | Older | B64C 9/02 |
| 2022/0276661 A1* | 9/2022 | Gupta | B64C 13/38 |
| 2023/0118630 A1* | 4/2023 | Olds | B64C 3/54 |
| | | | 244/131 |

FOREIGN PATENT DOCUMENTS

| | | |
|---|---|---|
| GB | 2584668 A | 12/2020 |
| WO | 2017118832 A1 | 7/2017 |

OTHER PUBLICATIONS

McDonnell Douglas F-4 Phantom II, printed Jun. 11, 2024, 1 page, available at URL: <https://upload.wikimedia.org/wikipedia/commons/2/2b/QF-4_Holloman_AFB.jpg>.

North American XB-70 Valkyrie, printed Jun. 11, 2024, 1 page, available at URL: <https://media.defense.gov/2006/Nov/22/2000533297/2000/2000/0/061122-F-1234P-019.JPG>.

* cited by examiner

AIRCRAFT WING WITH A MOVEABLE WING TIP

CROSS RELATED APPLICATION

This application claims priority to United Kingdom Patent Application GB 2309092.1, filed Jun. 16, 2023, the entire contents of which is hereby incorporated by reference.

BACKGROUND OF THE INVENTION

The present disclosure relates to an aircraft wing comprising a moveable wing tip.

The present invention also concerns an aircraft comprising a wing with a moveable wing tip, a wing tip for use in such an aircraft wing and a method of reducing aeroelastic flutter.

Aircraft with moveable wing tips are known. The wing tips may be moved from a flight configuration in which the wing tip contributes to the lift generated by the wing, but also contributes to the forces experienced by the wing inwards of the wing tip, to a load-alleviating configuration in which the wing tip does not contribute to the load experienced by the wing inwards of the wing tip. The wing tip is typically moved to a load-alleviating configuration in response to a high load event caused, for example, by a gust of wind or a particular aircraft manoeuvre. Such wing tips, under certain circumstances, may be subject to flutter, which is undesirable.

WO2017118832 and GB2546246 disclose an arrangement in which a wing tip is moveable between such a flight configuration and a load-alleviating configuration. Flutter is mitigated by providing a biasing member, damper or choosing a suitable hinge orientation. Using these approaches to mitigate flutter has been found to have some drawbacks. For example, springs and dampers may limit the ability for the wing tip to freely rotate, and the hinge orientation is determined in a design phase and is therefore difficult to adjust in due course once it has been set.

GB2584668 also discloses an arrangement in which a wing tip is moveable between such a flight configuration and a load-alleviating configuration. In this instance, flutter is mitigated by providing a balance mass to increase the polar moment of inertia of the wing tip.

The present invention may address the problems mentioned above. Alternatively or additionally, the present invention seeks to provide an improved aircraft wing with a moveable wing tip.

SUMMARY OF THE INVENTION

According to a first aspect of the invention, there is provided an aircraft wing, the wing comprising: a fixed wing, and a wing tip mounted at an end of the fixed wing; wherein the wing tip is rotatable relative to the fixed wing about a hinge axis, the wing is operable between: (i) a flight configuration for use during flight in which the wing tip forms an extension of the fixed wing; and (ii) a load-alleviating configuration for load alleviation during flight, wherein the wing tip is allowed to rotate about the hinge axis, under the action of aerodynamic forces exerted on the wing tip during flight, towards an equilibrium position, such that the load on the wing is reduced. The end of the fixed wing defines a wing plane, and in the flight configuration the wing tip extends below the wing plane such that the centre of gravity of the wing tip is located below the wing plane.

In the load-alleviating configuration, the equilibrium position of the wing tip, otherwise referred to as the coasting angle, may be arranged at a non-zero angle relative to the fixed wing. In some flight scenarios, it has been observed that there may be a relatively early onset of flutter, which is undesirable. It has now been found that by reducing the magnitude of the relative angle, the centre of gravity of the wing tip relative to the fixed wing is lowered, thereby reducing the likelihood of the onset of flutter (i.e. increasing the flutter speed). Thus, aspects of the present invention recognise that it may be beneficial to provide a wing tip that is inclined downwards, thereby lowering the centre of gravity and reducing the likelihood of the onset of flutter.

Unless stated otherwise, the coasting angle is measured directly across the hinge axis (i.e. immediately in the vicinity of that hinge axis). For example, the coasting angle may be measured between the wing plane and the plane containing the root of the wing tip. The plane containing the root of the wing tip may contain a root chord line of the root of the wing tip. Alternatively or additionally, the plane containing the root of the wing tip may contain a second chord line of the wing tip, located at a distance along the span of the wing tip outboard of the root. The second chord line may be located optionally at least 1% along the length of the wing tip, optionally at least 5%, optionally at least 15%. Typically the length of the wing tip is as measured along the ¼ chord line.

The end of the fixed wing defines the wing plane. It will be understood that the wing plane may therefore retain the dihedral or anhedral angle of the portion of the fixed wing near the end of the fixed wing. Thus, in embodiments of the invention, the wing tip may effectively have a lower centre of gravity than if the wing tip were merely an in-plane continuation of the fixed wing outboard of the hinge axis. The wing plane may contain a tip chord line of the end of the fixed wing. Alternatively or additionally, the wing plane may contain a second chord line of the fixed wing, located at a distance along the span of the fixed wing inboard of the end of the fixed wing. The second chord line may be located optionally at least 1% along the length of the fixed wing, optionally at least 5%, optionally at least 15%, optionally at least 25%. In some embodiments, for example, where the fixed wing is generally planar, the second location may be at least 50% and optionally 100% of the length of the fixed wing. Typically the length of the fixed wing is as measured along the ¼ chord line.

The wing plane may be substantially parallel with a top surface or a bottom surface of the fixed wing at the end of the fixed wing. More preferably the wing plane contains the chord lines of the fixed wing. The centre of gravity of the wing tip may be spaced vertically downwards by optionally at least 0.05 m, optionally at least 0.1 m, optionally at least 0.5 m, optionally at least 1 m, and optionally at least 2 m from the wing plane. This spacing may be measured from a location vertically aligned with the centre of gravity of the wing tip.

The fixed wing may have an upper surface and a lower surface, and the wing tip may have an upper surface and a lower surface. In the flight configuration, the upper and lower surfaces of the wing tip may be continuations of the upper and lower surfaces of the fixed wing. In the flight configuration, the trailing edge of the wing tip may be a continuation of the trailing edge of the fixed wing. The leading edge of the wing tip may be a continuation of the leading edge of the fixed wing. It may be that there is a smooth transition from the fixed wing to the wing tip. It will be appreciated that there may be a smooth transition even when the shape of the wing is such that there are changes in sweep or twist at the junction between the fixed wing and wing tip. It may be that there are no discontinuities at the junction between the fixed wing and wing tip. The position of the wing tip when the wing is in the flight configuration may be referred to as the flight position of the wing tip.

In the load-alleviating configuration, the wing tip may be moved relative to the fixed wing such that at least one of the upper and lower surfaces of the wing tip is moved away from the respective surface of the fixed wing.

It may be that in the load-alleviating configuration, no bending moment is transferred from the wing tip to the fixed wing. The wing may, for example, be operable into the load-alleviating configuration when the wing experiences a flight condition, such as a high wind or particular aircraft manoeuvre, that is likely to exert a large lifting force on the wing tip which would lead to a correspondingly large bending moment being transferred to the fixed wing if the wing were not in the load-alleviating configuration.

According to aspects of the invention, the extension of the wing tip below the wing plane may be achieved in a number of alternative or complementary arrangements, as will be described below. These arrangements seek to increase the airspeed at which flutter occurs.

It may be that in the flight configuration a portion of the wing tip is gulled downwards about a gull axis, relative to the wing plane.

In this way, the centre of gravity of the wing tip may be lowered by virtue of the geometry of the wing tip. The skilled person will be familiar with 'gulling' of wings (also referred to as 'gulled' wings or alike). It will be appreciated that being gulled downwards means inclined downwards relative to the wing plane. In other words, gulling, when defined in the flight configuration, may be exhibited by a portion or a whole of the wing tip exhibiting an anhedral angle relative to the fixed wing. The gulling may be between 5 and 20 degrees, for example between 7.5 and 12.5 degrees, for example between 9 and 11 degrees, for example approximately 10 degrees. A gulled wing tip may also be advantageous for reducing the dihedral effect of the wing, otherwise known as $C_{l\beta}$, which may be defined as the quantity of roll moment produced in proportion to the amount of sideslip. This may be more beneficial for higher aspect ratio wings, that is, the ratio of the wingspan to its mean chord.

A wing tip that is gulled downwards to an anhedral angle, in the flight configuration, may nonetheless exhibit a dihedral angle relative to the fixed wing in the load-alleviating configuration (due to the wing tip having rotated upwards relative to the fixed wing about the hinge axis under aerodynamic forces exerted on the wing tip during flight).

The hinge axis is preferably oriented non-parallel to the longitudinal axis of the aircraft. The hinge axis is preferably oriented non-parallel to the line of flight direction. The hinge axis is preferably oriented such that the hinge axis intersects the wing in a trailing edge region inboard of where the hinge axis intersects the wing in a leading edge region. In embodiments, the hinge axis may intersect the trailing edge and/or leading edge of the wing (for example when viewed from above).

The gull axis is preferably oriented non-parallel to the longitudinal axis of the aircraft. The gull axis is preferably oriented non-parallel to the line of flight direction. The gull axis is preferably oriented such that the gull axis intersects the wing in a trailing edge region inboard of where the gull axis intersects the wing in a leading edge region. In embodiments, the gull axis may intersect the trailing edge and/or leading edge of the wing (for example when viewed from above).

The hinge axis may be located in a vertical first plane, wherein the first plane intersects the trailing edge of the wing and the leading edge of the wing. Preferably, the hinge axis is oriented such that the first plane intersects the trailing edge of the wing inboard of where the first plane intersects the leading edge of the wing.

The gull axis may be located in a vertical first plane, wherein the first plane intersects the trailing edge of the wing and the leading edge of the wing. Preferably, the gull axis is oriented such that the first plane intersects the trailing edge of the wing inboard of where the first plane intersects the leading edge of the wing.

The hinge axis is preferably oriented such that the mean angle of incidence of the wing tip changes when the wing tip is rotated about the hinge axis. More preferably, the hinge axis is oriented such that the mean angle of incidence of the wing tip is reduced as the wing tip rotates away from the flight configuration.

The hinge axis may be orientated substantially perpendicular to the swept mean chord axis of the wing. The swept mean chord axis may be parallel to the longitudinal direction of the wing box. The orientation of the hinge axis may be chosen such that the direction of airflow over the wing in the region of the wing tip remains non-parallel to the hinge axis during flight. The orientation of the hinge axis may be chosen such that, for a given orientation of the wing tip, the direction of airflow remains incident on the same side of the wing tip despite the yaw of the aircraft.

The angle between the hinge axis and the longitudinal axis of the aircraft may be referred to as the "flare angle". The flare and may be between 10 and 20 degrees. An example flare angle is 17 degrees. A flared axis of rotation may refer to an axis of rotation of the wing tip that is non-parallel to the longitudinal axis of the aircraft.

Rotation of the wing tip about the hinge axis may be referred to as folding of the wing tip. The hinge axis may be a fold axis.

It may be that the gull axis is parallel to, and more preferably coaxial with, the hinge axis.

It may be that in the flight configuration the wing tip exhibits a nose-down twist relative to the end of the fixed wing. Such an arrangement may be especially beneficial in arrangements in which the gull axis is parallel to, or more preferably co-axial with, the hinge axis and in which the hinge axis is oriented such that the mean angle of incidence of the wing tip is reduced as the wing tip rotates upwards, away from the flight configuration. A wing tip exhibiting a nose-down twist may exhibit a decreased angle of attack relative to the fixed wing, thereby causing a loss in lift. This loss in lift may be recovered by the wing tip being gulled downwards relative to the wing plane. In preferred embodiments of the invention, the magnitude of the nose-down twist and the magnitude of the gulling are complimentary such that there is substantially no net change in lift, relative to an arrangement without the gulling and twist. The nose-down twist may be a geometric twist. The nose-down twist of the wing tip may be between 1 and 5 degrees, for example between 2 and 3 degrees, for example 2.5 degrees. In some embodiments, the nose-down twist may be aerodynamic twist rather than geometric twist.

In such an arrangement, the wing tip tends to exhibit a lower coasting angle/equilibrium position in the load-alleviating configuration (in comparison with an un-gulled/untwisted wing tip). This reduction in coasting angle has been found to correlate with an increase in the flutter speed. In some embodiments, the nose-down twist may be introduced at the hinge axis, and extend across a portion or the whole of the wing tip. In other embodiments, the nose-down twist may be introduced immediately outboard of the hinge axis, and extend across a portion or the majority of the wing tip. Introducing the nose-down twist immediately outboard of the hinge axis (but not at the hinge axis) may be beneficial because the resulting geometry tends to mean a greater aerodynamic force is required to move the wing tip to high coasting angles, such as greater than 70 degrees, or even up to 90 degrees. This may reduce the load on, and therefore the size of, any stops for preventing movement beyond high coasting angles. In some embodiments, it may be that the gull axis is located outboard of the hinge axis.

Gulling the wing tip about a gull axis located outboard of the hinge axis may be beneficial for simplifying construction of the wing tip in the region adjacent to the hinge axis.

The gull axis may be parallel to the hinge axis. In some embodiments, the gull axis may be parallel to the line of flight. It may be that the orientation of the gull axis is dependent upon the location of the gull axis. For example, once it has been decided to locate a gull axis outboard of the hinge axis, it tends to then be beneficial to orientate the gull axis parallel to the line of flight because the magnitude of the gulling has become independent of the coasting angle as measured directly across the hinge axis.

It may be that the wing tip exhibits an abrupt variation in inclination substantially at the gull axis. Folding the wing tip at the gull axis may simplify construction of the wing tip.

It may be that the wing tip is curved. Curving the wing tip may allow for greater manipulation of the degree of gulling across the span of the wing tip. Curving the wing tip may reduce or avoid the requirement for joints on the wing tip. The curving of the wing tip is preferably in a direction out of the wing plane, for example a curving of the anhedral of the wing tip.

It may be that the wing tip comprises a downlet. Compared to gulling across the majority of the wing tip, a downlet may enable a reduction in the span of the aircraft wing and improve gate clearances, when the wing tip is in the flight configuration.

It may be that the wing is provided with a restraining assembly for resisting movement of the wing tip from the flight configuration to the load-alleviating configuration. It may be that the restraining assembly is operable between a restraining mode in which the wing tip is held in the flight configuration using a restraining force and a releasing mode in which the restraining force on the wing tip is released, such that the wing tip may adopt the load-alleviating configuration. Such a restraining assembly is described in GB2546246. The restraining assembly may incorporate any of the features of the restraining assembly described in GB2546246, the content of which is incorporated herein.

Optionally, the wing may be provided with an actuator for moving the wing tip from the load-alleviating configuration to the flight configuration.

The wing tip may be operable to a ground configuration in which configuration the wing tip is moved away from the flight configuration such that the span of the aircraft wing is reduced. Optionally, the wing comprises an actuator for moving the wing tip to the ground configuration. This actuator may be used to move the wing tip from the load-alleviating configuration to the flight configuration.

The angle of rotation of the wing tip between the load-alleviating configuration and the ground configuration may optionally be at least 10 degrees, optionally at least 20 degrees, optionally at least 30 degrees, optionally at least 45 degrees, optionally at least 60 degrees and optionally up to 90 degrees. The angle will depend on the aerodynamic forces exerted on the wing tip during flight.

The length of the wing tip as defined along a midpoint of the wing may optionally be at least 10% of the length of the wing, optionally at least 15%, optionally at least 20%, optionally at least 25%, optionally at least 30%, optionally at least 35% and optionally at least 40% of the length of the wing.

The length of the wing tip as defined along a midpoint of the wing may be no more than 60% of the length of the wing, optionally no more than 50%, optionally no more than 40% and optionally no more than 30% of the length of the wing.

The length of the wing tip as defined along a midpoint of the wing may optionally be at least 1.0 m, optionally at least 2.5 m, optionally at least 3.0 m, optionally at least 4.0 m, optionally at least 5.0 m, optionally at least 6.0 m, optionally at least 7.0 m and optionally at least 20.0 m.

The length of the wing tip as defined along a midpoint of the wing may be no more than 20.0 m, optionally no more than 15.0 m, optionally no more than 10.0 m, optionally no more than 8.0 m, optionally no more than 7.0 m, optionally no more than 6.0 m and optionally no more than 5.0 m.

The length of the wing from root to tip in the flight configuration (in particular, but not, exclusively for a two-engine aircraft) as measured along the midpoint of the wing may be at least 5 m, optionally at least 15 m, optionally at least 20 m, optionally at least 25 m, optionally at least 30 m, optionally at least 35 m, optionally at least 40 m, optionally at least 45 m and optionally at least 60 m. It is envisaged that the aircraft wing of the present invention may facilitate the use of longer and optionally larger area movable wing tips.

The aircraft wing may be for use in an aircraft optionally having an operating empty weight of at least 20,000 kg, optionally at least 25,000 kg, optionally at least 30,000 kg, optionally at least 40,000 kg, optionally at least 100,000 kg and optionally at least 300,000 kg.

As mentioned above, the wing may optionally be operable into and out of (iii) a ground configuration for operation of the aircraft on the ground. In the ground configuration, the wing tip is positioned away from the flight configuration such that the span of the aircraft wing is reduced. For example, if the wing tip is operable into the ground configuration, the angle of rotation about the hinge axis of the wing tip between the flight configuration and the ground configuration may optionally be at least 60 degrees, optionally at least 80 degrees, optionally at least 90 degrees, and optionally at least 110 degrees. In the first configuration, the span may exceed an airport compatibility gate limit. In the ground configuration the span is reduced such that the span (with the wing tip in the ground configuration) is less than, or substantially equal to, the airport compatibility gate limit. In the ground configuration, the wing tip may be positioned such that the wing has its shortest span. In the ground configuration, the wing tip may be oriented substantially vertical. The wing tip may be moved from the flight configuration or the load-alleviating configuration to the ground configuration by rotating the wing about the hinge axis. The position of the wing tip when the wing is in the ground configuration may be referred to as the ground position.

In the ground configuration, if the wing tip comprises upper and lower surfaces, then at least one of the upper and lower surfaces of the wing tip are optionally moved further away from the respective surface of the fixed wing than when the wing is in a load-alleviating configuration. In the ground configuration, the effective length of the wing is reduced compared to when the wing is in the flight configuration and when in a load-alleviating configuration.

The wing tip may be a wing tip extension; for example the wing tip may be a planar tip extension. In other embodiments, the wing tip may comprise, or consist of, a non-planar device, such as a winglet.

According to a second aspect of the present invention there is provided an aircraft comprising the wing in accordance with the first aspect.

According to a third aspect of the present invention, there is provided a method of reducing aeroelastic flutter in a wing tip which is attached for rotational motion at an end of a fixed wing, the method comprising providing a wing tip extending below a wing plane defined by the end of the fixed wing, thereby lowering a centre of gravity of the wing tip by a first distance below the wing plane, the first distance defined when the wing tip forms an extension of the fixed wing.

The method may comprise those features described above in relation to the aircraft wing of the first aspect of the present invention.

According to a fourth aspect of the present invention, there is provided an aircraft wing, the wing comprising: a fixed wing, and a wing tip mounted at an end of the fixed wing; wherein the wing tip is rotatable relative to the fixed wing about a hinge axis, the wing is operable between: (i) a flight configuration for use during flight in which the wing tip forms an extension of the fixed wing; and (ii) a load-alleviating configuration for load alleviation during flight, wherein the wing tip is allowed to rotate about the hinge axis, under the action of aerodynamic forces exerted on the wing tip during flight, towards an equilibrium position, such that the load on the wing is reduced; wherein in the flight configuration, the wing tip is gulled downwards relative to the fixed wing such that flutter is mitigated in the flight configuration and/or the load-alleviating configuration.

According to a fifth aspect of the present invention, there is provided an aircraft wing, the wing comprising: a fixed wing, and a wing tip mounted at an end of the fixed wing; wherein the wing tip is rotatable relative to the fixed wing about a hinge axis, the wing is operable between: (i) a flight configuration for use during flight in which the wing tip forms an extension of the fixed wing; and (ii) a load-alleviating configuration for load alleviation during flight, wherein the wing tip is allowed to rotate about the hinge axis, under the action of aerodynamic forces exerted on the wing tip during flight, towards an equilibrium position, such that the load on the wing is reduced; wherein in both the flight configuration and the load-alleviating configuration, a portion of the wing tip is arranged at a dihedral or anhedral angle different from a dihedral or anhedral angle of the fixed wing.

It will of, course, be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
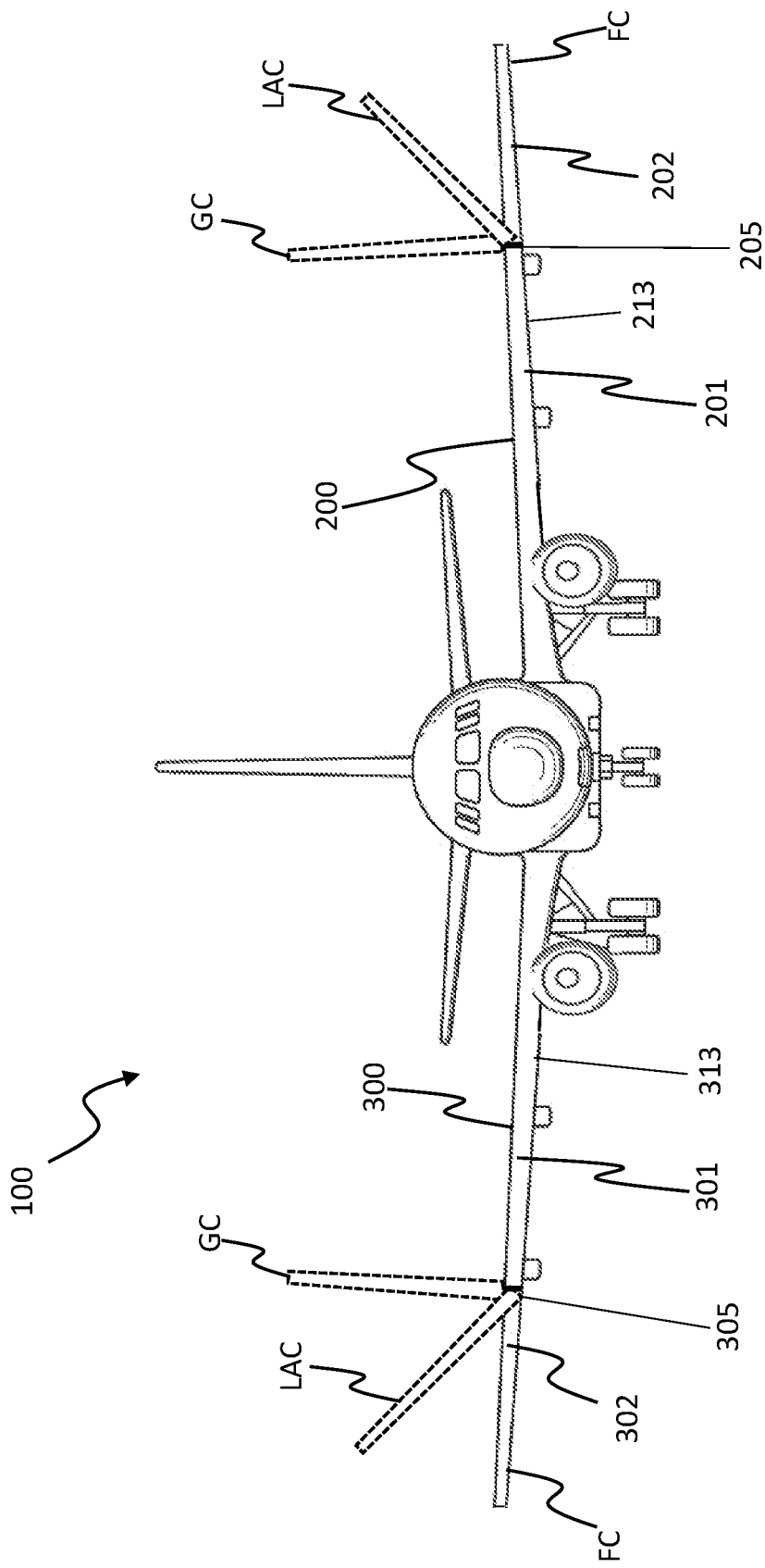
FIG. 1 shows a front-on view of a known aircraft.
Figure 2:
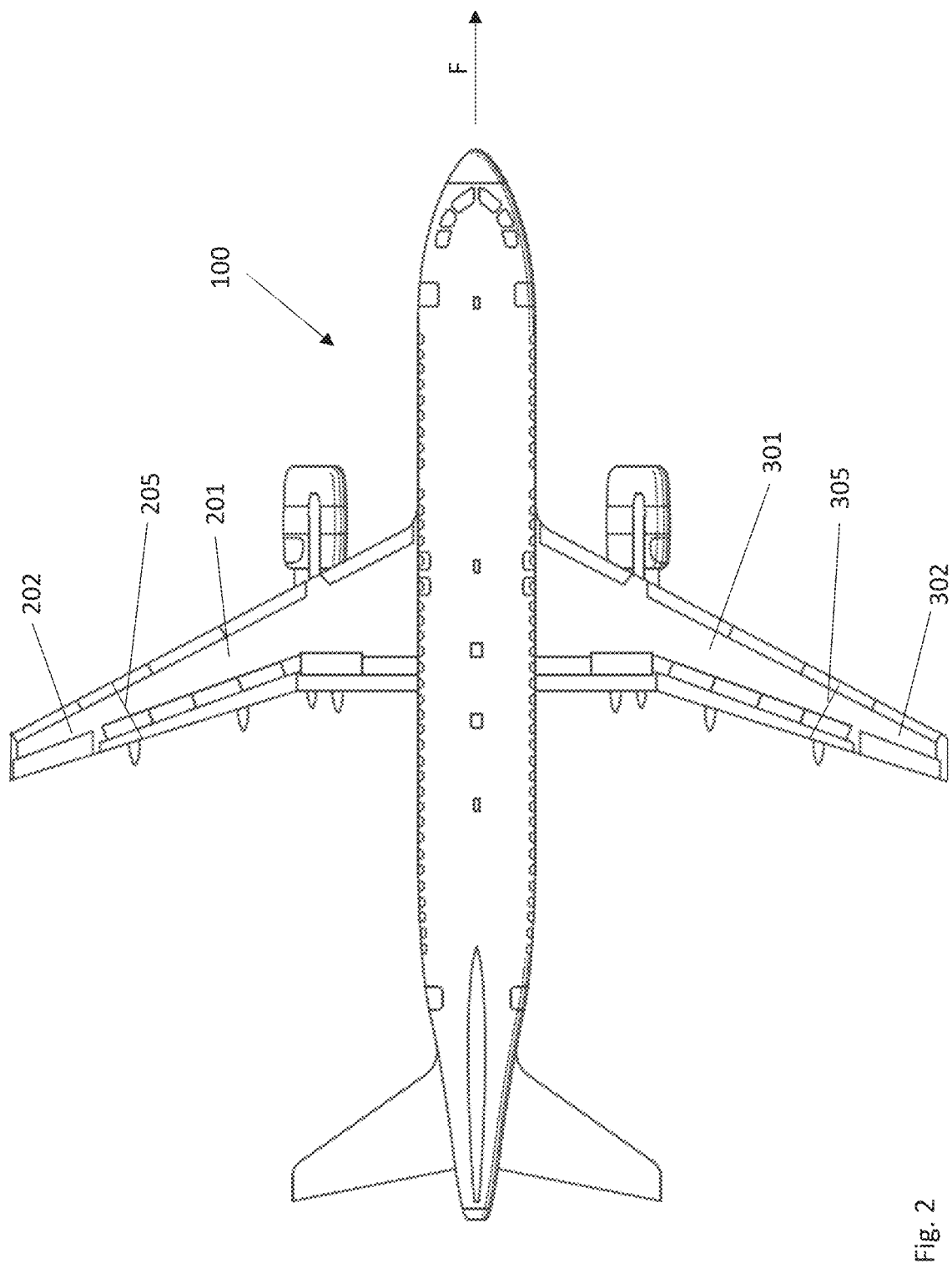
FIG. 2 shows a plan view of the aircraft of FIG. 1 when the wing tip is in the flight configuration.
Figure 3:
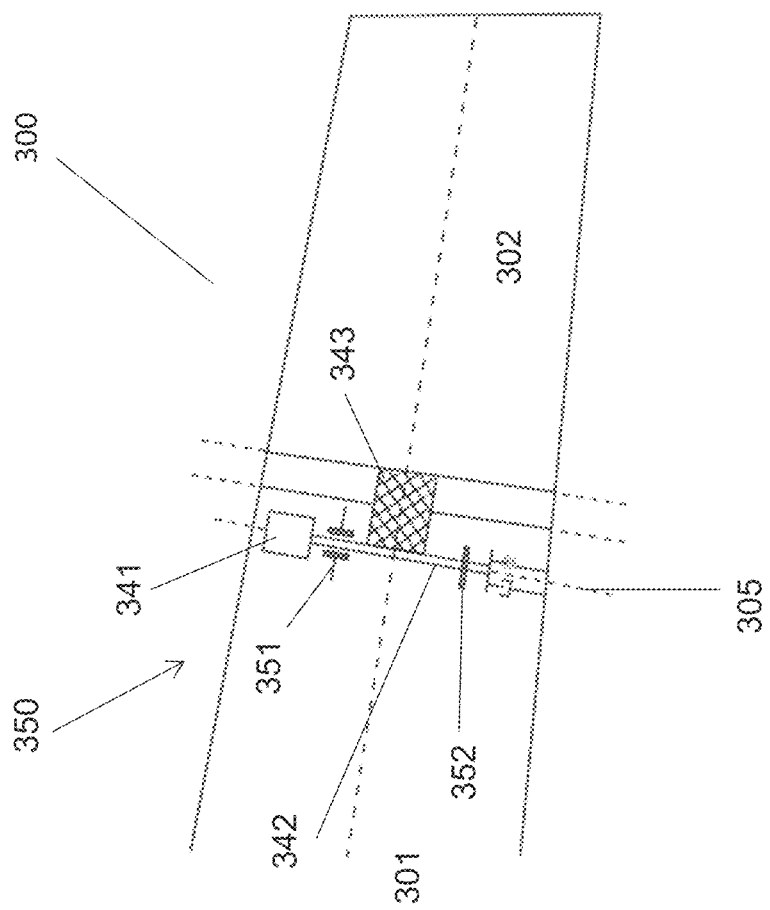
FIG. 3 shows a close-up schematic view of the wing tip of the aircraft of FIG. 1.

An example of a known aircraft is shown in FIGS. 1 to 3. The aircraft is denoted generally by reference numeral 100 and comprises two aircraft wings 200, 300. Each wing 200, 300 comprises a fixed wing 201, 301 and a wing tip 202, 302 mounted at an end of the fixed wing 201, 301. Each wing tip 202, 302 is rotatable relative to the respective fixed wing 201, 301 about a hinge axis 205, 305. Referring to FIG. 1, each wing 200, 300 is operable between (i) a flight configuration (FC) for use during flight in which the wing tip 202, 302 forms an extension of the fixed wing 201, 301 and (ii) a load-alleviating configuration (LAC) for load alleviation during flight, wherein the wing tip 202, 302 is allowed to rotate about the hinge axis 205, 305, under the action of aerodynamic forces exerted on the wing tip 202, 302 during flight, towards an equilibrium position, such that the load on the wing 200, 300 is reduced.

Lowering the centre of gravity of the wing tip has been identified as desirable in order to lower the wing tip flapping frequency with respect to the wing bending frequency, thereby reducing aeroelastic flutter, especially when the wing tip is in the load-alleviating condition.

Those skilled in the art will be familiar with aeroelastic flutter, for example, see https://en.wikipedia.org/wiki/Aeroelasticity#Flutter.

As indicated above, each wing 200, 300 is operable between a flight configuration FC and a load-alleviating configuration LAC. In the flight configuration FC, each wing tip 202, 302 is a continuation of the fixed wing 201, 301, and each wing tip 202, 302 is effectively rigidly coupled to the respective fixed wing 201, 301 so that any lift force generated by the wing tip 202, 302 during flight exerts a bending moment on the wing. During certain flight-related events (e.g. gust of wind or when the aircraft undertakes certain manoeuvres) the lift generated by the wing tip 202, 302 and the associated bending moment may become undesirably large, and under such circumstances the wing 200, 300 is operable to the load-alleviating condition (LAC) in which the wing tip is allowed to rotate about the hinge axis, under the action of aerodynamic forces exerted on the wing tip during flight, towards an equilibrium position, such that the load on the wing is reduced. Operation into the load-alleviating configuration LAC is discussed below.

Each wing 200, 300 is provided with a restraining assembly 350 that is operable to allow the wing tip 201, 301 to rotate about the hinge axis 205, 305. An example of a restraining assembly is described in detail in WO2017118832 and GB2546246, and an example is also described here for convenience.

Referring to FIG. 3, the aircraft 100 is provided with a restraining assembly 350. The restraining assembly 350 comprises a brake 351 and a clutch 352, and will now be described in more detail.

The brake 351 comprises two pads configured to selectively clamp against a shaft 342 to restrain its rotation. The restraining assembly 350 is operable between a restraining mode (in which the brake 351 is deployed to brake the rotation of the shaft 342), and a releasing mode (in which the brake 351 is released by pulling the pads away from the shaft 342 to allow its free rotation (and thus the rotation of the wing tip 302)).

The default (passive) mode of the restraining assembly 350 is the restraining mode in which the shaft 342 is braked. When the wing tip 302 is in the flight configuration, the power to the restraining assembly 350 is switched OFF (i.e. the assembly is passive) and the restraining assembly 350 is left with the shaft 342 braked. Such an arrangement is attractive as it ensures an active command (e.g. an ON signal) is required to move the wing tip device)

The restraining assembly 350, including the brake 351, is controlled by a control module 343 of the Electronic Flight Control System (EFCS). The control module 343 is shown as a box in the schematic of FIG. 3.

The module 343 is configured to receive a measurement of the local angle of attack from an alpha vane (not shown) on the nose of the aircraft 100. During cruise flight, the restraining assembly 350 is OFF and the brake 351 is braked onto the shaft 342. However, when the measurement from the alpha detector indicates an oncoming gust (i.e. a significant change in angle of attack) the control module 343 switches the restraining assembly ON, which releases the brake 351.

Such an arrangement enables the wing tip 302 to be securely held in the flight configuration during normal cruise flight, but by switching the releasing assembly ON to release the brake 351, the wing tip 302 is movable quickly to the load alleviating configuration. This means the wing can avoid being subjected to high gust loadings. This in turn may enable the wing 300 to have a relatively large span, without necessarily having to incur the associated weight penalty, because it can be designed for a lower magnitude of maximum load.

The wing tip 302 may, at least partially, be moveable to the load-alleviating configuration purely under the action of aerodynamic force acting on it during flight, or under gust loads.

The restraining assembly also comprises a clutch 352 located on the hinge 305. The clutch 352 serves to selectively engage/disengage opposing ends of the hinge 305. Such an arrangement has been found to be beneficial because, in the event of failure of the restraining assembly 350, it may enable unwanted movement of the wing tip 302 to be prevented.

The aircraft 100 also comprises a motor 341. When the wing 300 is in the flight configuration FC, the motor 15 is in a passive state such that it does not actively contribute to restraining the wing tip 302 in the flight configuration (except for resistance as a result of rotational inertia). When the wing tip 302 has been moved to the load alleviating configuration LAC, the motor 341 may, however, be activated such that it rotates the wing tip 302 back to the flight configuration FC. Once in that position, the restraining assembly 350 is switched back into restraining mode such that the brake 351 is applied, and the motor 341 is again returned to its passive state. Thus the motor 341 is used to move the wing tip 302 between the flight and load alleviating configuration.

The wing 300 is also operable to a ground configuration GC in which the wing span of the aircraft 100 is reduced so that the aircraft can comply with airport gate limits. The motor 341 is arranged to rotate the wing tip 302 between the flight configuration FC and the ground configuration by actuation of the motor 341.

It is worth noting the orientation of the hinge axis 205, 305. Each of said axes 205, 305 is at an angle of about 17 degrees to the longitudinal axis of the aircraft and the flight direction of the aircraft, denoted by "F" in FIG. 2. The flight direction F corresponds to the longitudinal axis of the aircraft 100. This so-called "flaring" of the hinge axis away from the flight direction F means that the mean angle of incidence of the wing tip changes when the wing tip device is rotated about the hinge axis. The hinge axis is oriented such that the mean angle of incidence of the wing tip is reduced as the wing tip device rotates away from the flight configuration.

An example of an aircraft wing and an aircraft in accordance with an embodiment of the present invention will now be described by way of example only with reference to FIGS. 4 to 8.

Figure 4:
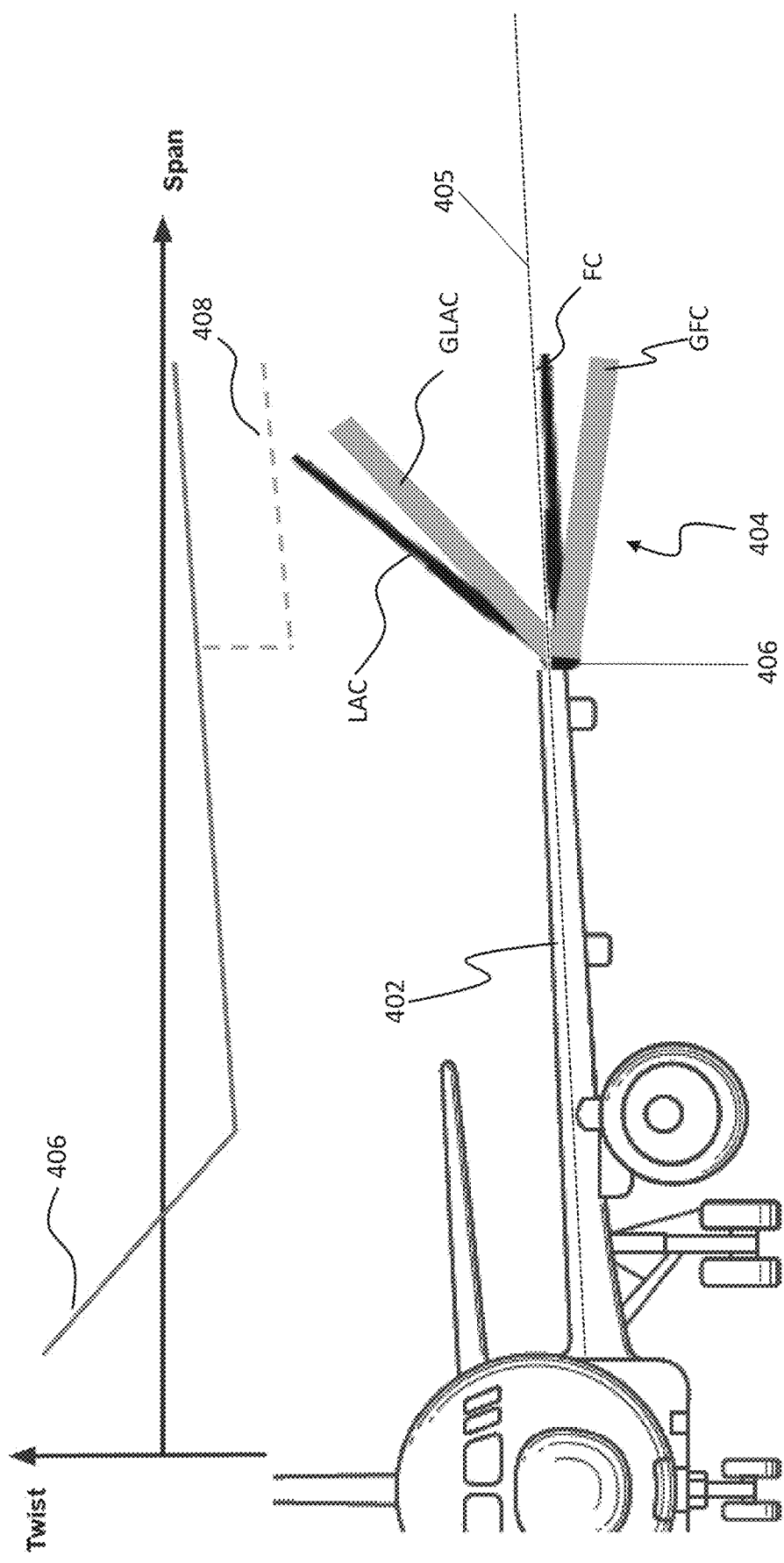
FIG. 4 shows an example of an embodiment of an aircraft with a gulled wing tip.

In FIG. 4 a front view of an aircraft is shown, which is similar to the examples previously discussed, and may include any of the features shown in FIGS. 1 to 3. The aircraft has a fixed wing 402 with a gulled wing tip 404 mounted at an end thereof, the gulled wing tip 404 being rotatable relative to the fixed wing 402 about a hinge axis 406. The hinge axis 406 is 'flared' in the manner referred to in FIGS. 1-3 and is not directly in line of flight. However, for the sake of simplicity the change in angle of the gulled wing tip 404 is shown from the perspective of line of flight and does not show the change in orientation of the upper and lower surfaces of the wing tip. For clarity, only one wing of the aircraft is shown.

The flight configuration (FC) and load-alleviating configuration (LAC) of the non-gulled wing tip in accordance with the previous examples are shown in thin lines that mirror the style of the fixed wing. The gulled wing tip 404 in accordance with the embodiment of the invention is shown in thicker lines, in a gulled flight configuration (GLAC) and a gulled load-alleviating configuration (GLAC).

Overlaid onto the fixed wing 402 and extending outboard of the root of the fixed wing 402 is a wing plane 405, which is shown as a broken line with a white outline. This wing plane 405 substantially follows the same dihedral angle as the fixed wing 402, which in the example shown is generally planar. It will be appreciated that in other embodiments where the fixed wing 402 has a variable dihedral, the wing plane 405 may follow an angle of an outer portion of the fixed wing 402, for example the outer 10%.

To lower the centre of gravity of the wing tip in both configurations, the wing tip is gulled downwards relative to wing plane 405 to form a gulled wing tip 404 with a gulled flight configuration (GFC) and a gulled load-alleviating configuration (GLAC), shown in wide, rectangular lines extending outboard from the hinge axis 406. Both the gulled flight configuration (GFC) and the gulled load-alleviating configuration (GLAC) are rotated downwards (clockwise) by a fixed angle relative to the respective flight configuration (FC) and load-alleviating configuration (LAC). In this way, the gulled wing tip 404 in the gulled flight configuration (GFC) does not merely continue the dihedral angle of the fixed wing (402), but forms an anhedral angle relative to the end of the fixed wing 402. In this instance, the gulling of the gulled wing tip 404 is at, and about, the hinge axis 406 (i.e. the gull axis and the hinge axis are coaxial), and accordingly the gulled wing tip 404 itself has a substantially planar form.

A graph is shown above the aircraft 400 in FIG. 4. The x-axis of the graph denotes the span of the aircraft wing, and is horizontally aligned with the aircraft wing to indicate particular points along span of the wing. The y-axis of the graph denotes the twist of the aircraft wing, intersecting the x-axis at a zero twist value. The graph will be described from a minimum to a maximum x-axis value, thereby following the span of the wing from its root to its tip.

A solid line 406 schematically shows the span versus twist for a known aircraft wing without a gulled wing tip 404, i.e. with a wing tip exhibiting a normal flight configuration (FC). The solid line 406 has a positive value of twist, i.e. nose-up twist, at a minimum x-axis value near the root of the aircraft wing. A first portion of the solid line 406 has a negative gradient, to indicate the twist of the aircraft wing changing from a positive value (nose-up) to a negative value (nose-down) at approximately 25% span of the wing. At this point, the twist of the aircraft wing reaches its lowest (i.e. most negative, nose-down) value. From this point, the solid line 406 has a positive gradient, to indicate that the fixed wing 402 and wing tip then exhibit a gradual change in twist, from a more aggressive nose-down twist to a marginal nose down twist at maximum span, near the end of the wing tip. There is no discernible change in gradient at the point on the graph horizontally aligned with the hinge axis 406, indicating that this change in twist is substantially continuous across the transition between the fixed wing 402 and the wing tip.

Also shown on the graph is a dashed line 408, indicating the different twist characteristics exhibited by the gulled wing tip 404 in the embodiment of the invention. At an x-axis point directly aligned with the hinge axis 406, the dashed line 408 has a substantially vertical portion, indicating an abrupt change in twist at the hinge axis 406, at the transition between the fixed wing 402 and the gulled wing tip 404. The dashed line 408 then mirrors the gradual positive gradient of the solid line 406, indicating that the gulled wing tip 404 also exhibits a gradual change in twist, from a more aggressive nose-down twist to a marginal nose-down twist at maximum span, near the end of the gulled wing tip 404. At a maximum span along the x-axis, the dashed line 408 is displaced vertically downwards from the solid line 406. This y-axis displacement indicates the increased nose-down twist exhibited by the gulled wing tip 404 when compared to the wing tip in a known arrangement.

Importantly, in the first embodiment of the invention, this change in magnitude of the nose-down twist (i.e. reducing effective angle of attack) is complementary with the magnitude of the gulling (i.e. increasing the effecting angle of attack as a result of the flared orientation of the hinge/gull axis), such that there is substantially no net change in 1 g lift, relative to an arrangement without the gulling and twist. This means that the coasting angle/equilibrium position of the wing tip in the load alleviating configuration becomes lower (compared to the prior art untwisted/ungulled wing tip). As a result, and with reference to the graph of FIG. 5, the arrangement of the first embodiment therefore provides an improved flutter performance whilst minimising changes to lift distribution.

Figure 5:
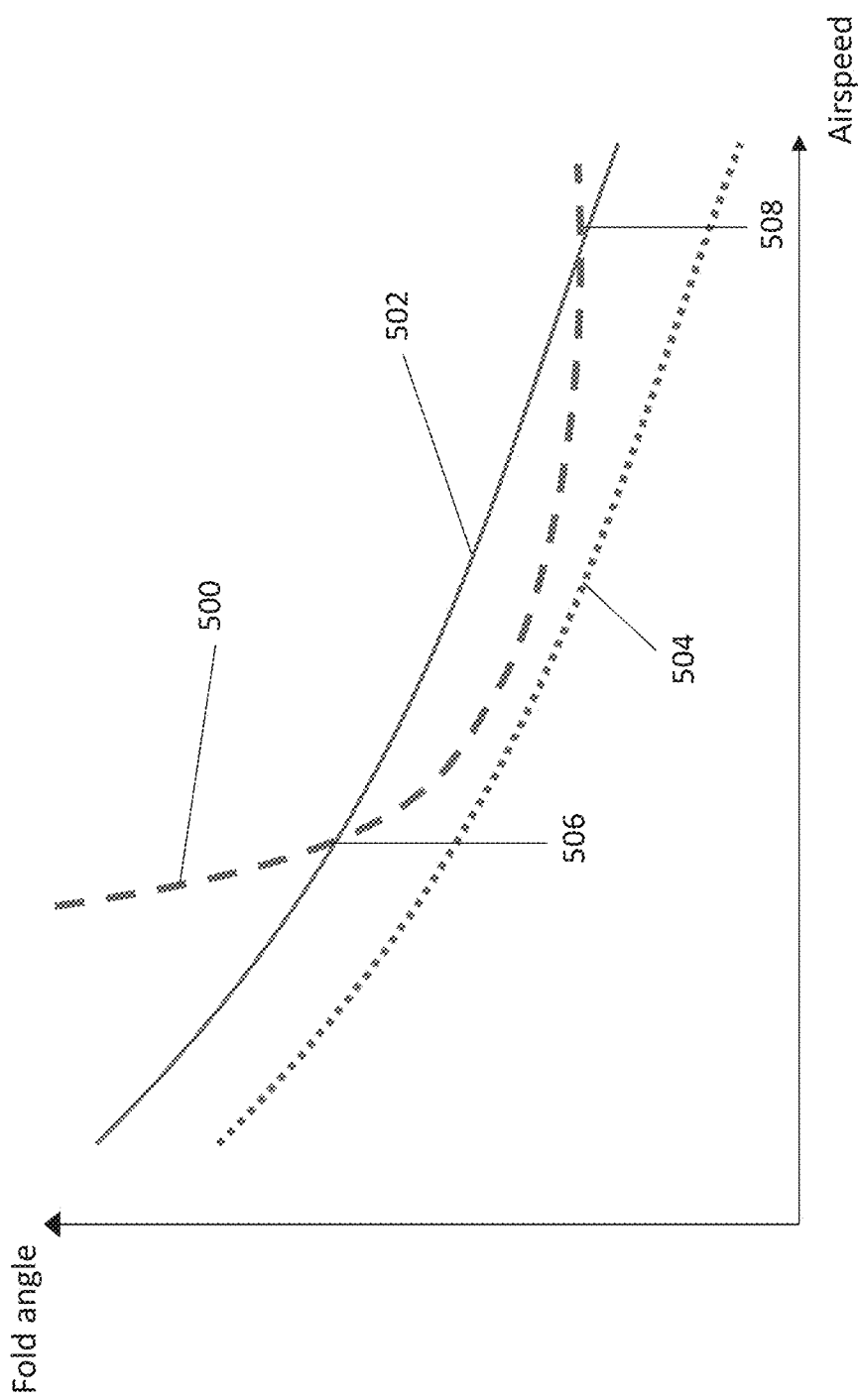
FIG. 5 shows a graph demonstrating the effect of gulling the wing tip on the coasting angle/equilibrium position of the gulled wing tip.

FIG. 5 shows a graph demonstrating the effect of gulling the gulled wing tip 404 on the coasting angle/equilibrium position of the gulled wing tip 404. The x-axis of the graph denotes aircraft airspeed, while the y-axis denotes the fold angle of the gulled wing tip 404 (i.e. the relative angle between the fixed wing 402 and the gulled wing tip 404) across the hinge axis. A broken line 500 in the form of an open simple upward curve represents flutter speed loci. In other words, the broken line 500 shows the fold angle of the gulled wing tip 404 at which flutter occurs as a function of airspeed.

A continuous line 502 in the form of an open simple upward curve represents the fold angle, adopted in the load alleviating configuration, as a function of the aircraft airspeed for a non-gulled wing tip. Displaced vertically downwards from the continuous line 502 is a dotted line 504, which represents the fold angle, adopted in the load alleviating configuration, as a function of the aircraft airspeed for a gulled wing tip 404 in accordance with the first embodiment of the invention. The continuous line 502 intersects the broken line 500 at two points 506, 508, since the broken line 500 exhibits greater curvature than the continuous line 502. For all fold angles of the known wing tip in the airspeed window between the two points 506, 508, the wing tip may be prone to flutter.

Since the dotted line 504 (showing the behaviour of the gulled wing tip 404 of the first embodiment of the invention) is displaced vertically downwards from the continuous line 502, it does not intersect the broken line 500. This illustrates how flutter is therefore mitigated for the gulled wing tip 404 across a range of conventional airspeeds. This may be the case in both the gulled flight configuration (GFC) and the gulled load-alleviating configuration (GLAC). It will be appreciated that similar relationships to the ones shown in the graph will be present for other load factors from manoeuvres or gusts.

This behaviour is thought to be exhibited due to the centre of gravity of the gulled wing tip being lowered, for example moved below the plane of the fixed wing in the flight configuration. In the first embodiment of the invention, this is achieved through the wing tip being gulled about an axis that is co-axial with the hinge line. However, other embodiments of the invention may achieve this effect in different ways, as will now be described with reference to FIGS. 5-8.

Figure 6:
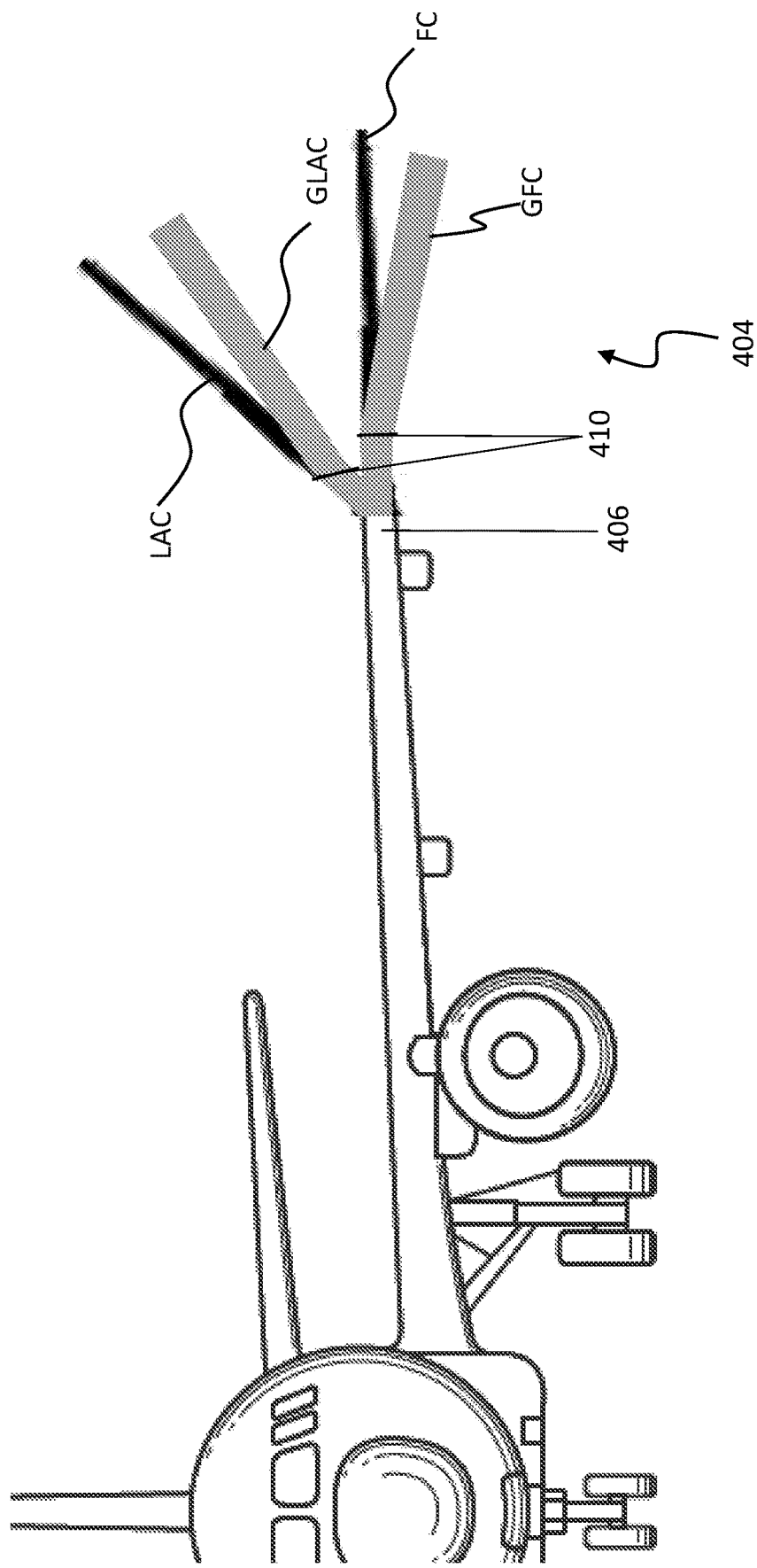
FIG. 6 shows an example of an embodiment of an aircraft with a wing tip gulled outboard of a hinge axis.

FIG. 6 shows another example of an aircraft with a gulled wing tip 404. In this instance, the gulled wing tip 404 is gulled about a gull axis 410, which instead of being coaxial with the hinge axis 406, as shown in FIG. 4, is located outboard of the hinge axis 406. In other words, the gulled wing tip 404 is gulled downwards at a point along the span of the wing tip 404, outboard of the hinge axis 406. In this example, the coasting angle/equilibrium position of the gulled wing tip 404 directly across the hinge axis 406 (i.e. the portion of the wing tip inboard of gull axis 410) is substantially unaffected because that portion of the wing tip remains planar with the wing plane in the flight configuration. In that sense, there is a fixed behaviour of fold angle vs speed in the graph of FIG. 5. However, the centre of gravity of the gulled wing tip 404 is nonetheless lowered by virtue of the gulling, and this changes the flutter speed loci, moving it to the right in FIG. 5, and thus increasing the flutter speed.

Figure 7:
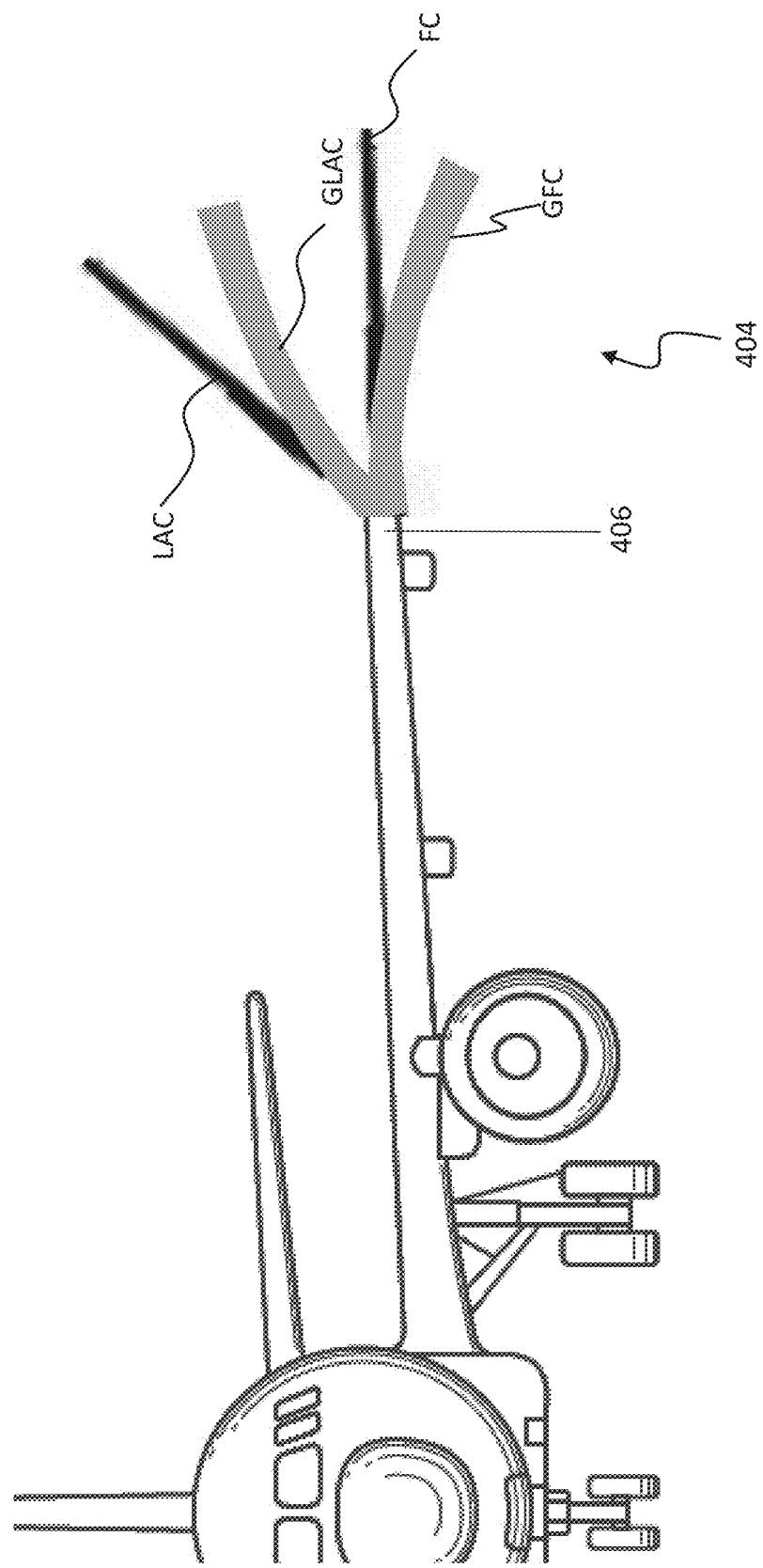
FIG. 7 shows an example of an embodiment of an aircraft with a curved wing tip.

FIG. 7 shows a further embodiment of an aircraft with a gulled wing tip 404. In this instance, the gulled wing tip 404 is gulled via curving of the gulled wing tip 404. The curve pictured is substantially constant across the length of the gulled wing tip 404, although other curves are contemplated. In this example, the coasting angle/equilibrium position of the gulled wing tip 404 directly across the hinge axis 406 (i.e. immediately in the vicinity of that hinge axis) is substantially unaffected, and the centre of gravity of the gulled wing tip 404 is nonetheless lowered by virtue of the curving.

Figure 8:
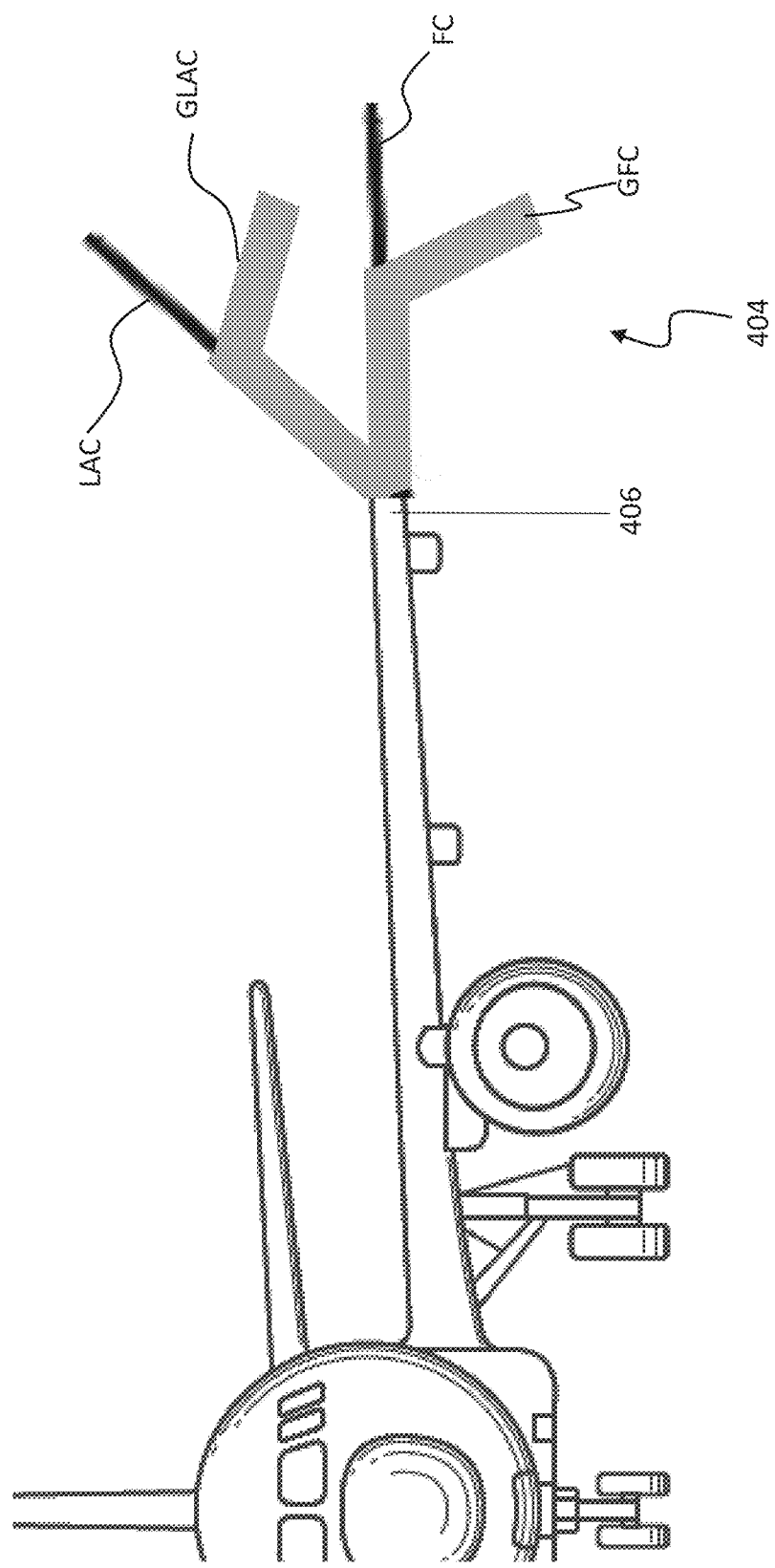
FIG. 8 shows an example of an embodiment of an aircraft with a wing tip provided with a downlet.

FIG. 8 shows a further embodiment of an aircraft with a gulled wing tip 404. In this instance, the gulled wing tip 404 is gulled via the provision of a downlet at the end of the gulled wing tip 404. In other words, the gulled wing tip 404 comprises an abrupt change in incline at approximately 60% of its span, with the outboard portion of the gulled wing tip 404 being gulled downwards. In this example, the coasting angle/equilibrium position of the gulled wing tip 404 directly across the hinge axis 406 (i.e. inboard of the downlet) is substantially unaffected, and the centre of gravity of the gulled wing tip 404 is nonetheless lowered by virtue of the downlet.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The example of the aircraft described above in relation to FIGS. 1 to 3 describes a wing tip that is movable to a load-alleviating configuration and to a ground configuration. Those skilled in the art will realise that the aircraft may have a wing tip that is movable from a flight configuration to only the load-alleviating configuration.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft wing, the wing comprising:
a fixed wing, and
a wing tip mounted at an end of the fixed wing;
wherein
the wing tip is rotatable relative to the fixed wing about a hinge axis,
the wing is operable between:
  (i) a flight configuration for use during flight in which the wing tip forms an extension of the fixed wing; and
  (ii) a load-alleviating configuration for load alleviation during flight, wherein the wing tip is allowed to rotate about the hinge axis, under the action of aerodynamic forces exerted on the wing tip during flight, towards an equilibrium position, such that the load on the wing is reduced;
wherein the end of the fixed wing defines a wing plane, and wherein in the flight configuration the wing tip extends below the wing plane such that the centre of gravity of the wing tip is located below the wing plane; and,
wherein in the flight configuration a portion of the wing tip is gulled downwards about a gull axis located outboard of the hinge axis, relative to the wing plane.

2. The aircraft wing according to claim 1, wherein in the flight configuration the wing tip exhibits a nose-down twist relative to the end of the fixed wing.

3. The aircraft wing according to claim 1, wherein the gull axis is coaxial with the hinge axis.

4. The aircraft wing accordingly to claim 1, wherein the wing tip is inclined at the gull axis.

5. The aircraft wing according to claim 1, wherein the wing tip is curved.

6. The aircraft wing according to claim 1, wherein the wing tip comprises a downward winglet.

7. The aircraft wing according to claim 1, wherein the wing is provided with a restraining assembly for resisting movement of the wing tip from the flight configuration to the load-alleviating configuration.

8. The aircraft wing according to claim 7, wherein the restraining assembly is operable between a restraining mode in which the wing tip is held in the flight configuration using a restraining force and a releasing mode in which the restraining force on the wing tip is released, such that the wing tip may adopt the load-alleviating configuration.

9. The aircraft wing according to claim 1, wherein the hinge axis is oriented non-parallel to the longitudinal axis of the aircraft.

10. The aircraft wing according to claim 1, operable into and out of (iii) a ground configuration for operation of the aircraft on the ground, in which ground configuration, the wing tip is positioned away from the flight configuration such that the span of the aircraft wing is reduced.

11. The aircraft comprising the wing according to claim 1.

12. A method of reducing aeroelastic flutter in a wing tip which is attached for rotational motion along a hinge axis at an end of a fixed wing, comprising:
providing a wing tip extending below a wing plane defined by the end of the fixed wing, thereby lowering a centre of gravity of the wing tip by a first distance below the wing plane, the first distance defined when the wing tip forms an extension of the fixed wing during a flight configuration; and,
wherein in the flight configuration a portion of the wing tip is gulled downwards about a gull axis located outboard of the hinge axis, relative to the wing plane.

13. An aircraft wing, comprising:
a fixed wing, and
a wing tip mounted at an end of the fixed wing;
wherein
the wing tip is rotatable relative to the fixed wing about a hinge axis,
the wing is operable between:
  (i) a flight configuration for use during flight in which the wing tip forms an extension of the fixed wing; and
  (ii) a load-alleviating configuration for load alleviation during flight, wherein the wing tip is allowed to rotate about the hinge axis, under the action of aerodynamic forces exerted on the wing tip during flight, towards an equilibrium position, such that the load on the wing is reduced;
wherein in the flight configuration, the wing tip is gulled downwards relative to the fixed wing such that flutter is mitigated in the flight configuration and/or the load-alleviating configuration; and,
wherein in the flight configuration a portion of the wing tip is gulled downwards about a gull axis located outboard of the hinge axis, relative to the wing plane.

14. An aircraft wing, comprising:
a fixed wing, and
a wing tip mounted at an end of the fixed wing;

wherein
the wing tip is rotatable relative to the fixed wing about a hinge axis,
the wing is operable between:
(i) a flight configuration for use during flight in which the wing tip forms an extension of the fixed wing; and
(ii) a load-alleviating configuration for load alleviation during flight, wherein the wing tip is allowed to rotate about the hinge axis, under the action of aerodynamic forces exerted on the wing tip during flight, towards an equilibrium position, such that the load on the wing is reduced;
wherein in both the flight configuration and the load-alleviating configuration, a portion of the wing tip is arranged at a dihedral or anhedral angle different from a dihedral or anhedral angle of the fixed wing; and,
wherein in the flight configuration a portion of the wing tip is gulled downwards about a gull axis located outboard of the hinge axis, relative to the wing plane.

\* \* \* \* \*